(12) United States Patent
Siegel et al.

(10) Patent No.: US 7,635,921 B2
(45) Date of Patent: Dec. 22, 2009

(54) SELF-POWERED MOBILE ELECTRICAL POWER HUB

(75) Inventors: Neil G. Siegel, Rolling Hills Estates, CA (US); Chris Hassapis, Hermosa Beach, CA (US); W. Daniel Hillis, Encino, CA (US); Dan Danknick, Santa Ana, CA (US)

(73) Assignee: Northrop Grumman Space & Mission Systems Corporation, Los Angeles, CA (US)

( * ) Notice: Subject to any disclaimer, the term of this patent is extended or adjusted under 35 U.S.C. 154(b) by 66 days.

(21) Appl. No.: 11/697,489

(22) Filed: Apr. 6, 2007

(65) Prior Publication Data

US 2008/0246355 A1 Oct. 9, 2008

(51) Int. Cl.
*B62D 51/00* (2006.01)
(52) U.S. Cl. .................................. 290/1 A; 290/1 R
(58) Field of Classification Search ................ 290/1 A
See application file for complete search history.

(56) References Cited

U.S. PATENT DOCUMENTS

| | | | | |
|---|---|---|---|---|
| 3,904,878 A | * | 9/1975 | Burch et al. ................. 378/60 |
| 4,006,359 A | * | 2/1977 | Sullins et al. ................ 378/60 |
| 4,554,989 A | * | 11/1985 | Gruich et al. .............. 180/65.4 |
| 4,694,577 A | * | 9/1987 | van der Merwe et al. .. 30/379.5 |
| 4,990,209 A | * | 2/1991 | Rakes ......................... 156/351 |
| 6,212,748 B1 | * | 4/2001 | Porter et al. ................ 29/281.5 |
| 2003/0164256 A1 | * | 9/2003 | Murray et al. ............. 180/54.1 |
| 2006/0005736 A1 | * | 1/2006 | Kumar ......................... 105/1.4 |
| 2006/0027547 A1 | * | 2/2006 | Silvestro ..................... 219/133 |
| 2006/0076167 A1 | * | 4/2006 | Setrakian et al. ............. 180/8.1 |

FOREIGN PATENT DOCUMENTS

| | | | |
|---|---|---|---|
| EP | 1391370 A1 | * | 2/2004 |
| JP | 07184450 A | * | 7/1995 |
| JP | 2004242558 A | * | 9/2004 |

OTHER PUBLICATIONS

Translation of EP 1 391 370 A1, Nov. 2008 by FLS, Inc.*

* cited by examiner

*Primary Examiner*—Joseph Waks
(74) *Attorney, Agent, or Firm*—Tarolli, Sundheim, Covell & Tummino LLP

(57) ABSTRACT

Self-powered mobile electrical power hubs are provided. In one embodiment, a self-powered electrical power hub comprises an internal combustion engine driven generator that provides electrical power and at least one electrically powered transport driver configured to facilitate movement of the self-powered mobile electrical power hub. The self-powered mobile electrical power hub further comprises an accessible power hub that provides external access to electrical power, wherein a substantial portion of the electrical power from the internal combustion engine driven generator is provided to power the at least one electrically powered transport driver in a transport mode and a substantial portion of the electrical power from the internal combustion engine driven generator is available at the accessible power hub in an idle mode.

22 Claims, 5 Drawing Sheets

SELF-POWERED MOBILE ELECTRICAL POWER HUB

TECHNICAL FIELD

The present invention relates generally to electrical power, and more particularly to a self-powered mobile electrical power hub.

BACKGROUND

Mobile devices and other mobile equipment requiring power are used in many settings, including many where spare batteries in sufficient quantities to power the devices and equipment for a given task duration would be an intolerable burden and portable power sources are cumbersome and difficult to carry. One example is Army or Special Force military units operating in terrain where they cannot take a vehicle. A typical mission can last one to two weeks without re-supply. The weight and size of the required batteries for all of the unit's devices (e.g., radios, laser range-finders, computers, night-vision devices, enhanced optical sights, GPS receivers, etc.) for the complete duration of the mission is far more than is feasible to carry. Many other settings require power sources, such as search and rescue missions, geological and geographical survey teams, explorer teams, mountain climbing teams and other setting in which portable power sources are desirable. Portable generators have been available for a long time, but the portable generators and the fuel to operate the portable generators are often too heavy to be hand-carried for long distances.

SUMMARY

In accordance with an aspect of the present invention, a self-powered mobile electrical power hub is provided. The self-powered mobile electrical power hub comprises an internal combustion engine driven generator that provides electrical power and at least one electrically powered transport driver configured to facilitate movement of the self-powered mobile electrical power hub. The self-powered electrical power hub further comprises an accessible power hub that provides external access to electrical power, wherein a substantial portion of the electrical power from the internal combustion engine driven generator is provided to power the at least one electrically powered transport driver in a transport mode and a substantial portion of the electrical power from the internal combustion engine driven generator is available at the accessible power hub in an idle mode.

In another aspect of the present invention, a self-powered mobile electrical power hub is provided. The self-powered mobile electrical power hub comprises an internal combustion engine driven generator for providing AC electrical power, at least one rectifier and associated DC/DC converter for converting AC power from the internal combustion engine driven generator to DC power, a plurality of mechanical transport mechanisms that move the self-powered mobile electrical power hub, and a plurality of electrically driven transport drivers that each drive a respective transport mechanism of the plurality of mechanical transport mechanisms. The self-powered mobile electrical power hub further comprises an accessible power hub that provides external access to electrical power, wherein the accessible power hub includes at least one battery charge compartment configured to employ DC power to charge at least one battery.

In yet another aspect of the present invention, a self-powered mobile electrical power hub is provided. The self-powered mobile electrical power hub comprises means for providing electrical power, means for moving the self-powered mobile electrical power hub, and means for providing external access to electrical power, wherein a substantial portion of the electrical power from means for providing electrical power is provided to the means for moving the self-powered mobile electrical power hub in a transport mode and a substantial portion of the electrical power from the means for providing electrical power is available at the means for providing external access to electrical power in an idle mode.

DETAILED DESCRIPTION

The present invention relates to a self-powered mobile electrical power hub that includes an internal-combustion-engine-driven generator that provides electrical power, and powered transport drivers configured to facilitate movement of the self-powered mobile electrical power hub. The self-powered mobile electrical power hub further comprises an accessible power hub that provides external access to electrical power, wherein a substantial portion of the electrical power from the internal combustion driven generator is provided to power the at least one electrically powered transport driver in a transport mode and a substantial portion of the electrical power from the internal combustion driven generator is available at the accessible power hub in an idle mode. A transport mode is defined as a mode in which the self-powered mobile electrical power hub is moving or transporting, while an idle mode is defined as a mode in which the self-powered mobile electrical power hub is stationary with the engine idling. The self power mobile electrical power hub can allow for the portability of electrical power to terrains in which it is impractical to take vehicles or to carry mobile generators and fuel for the generators across the terrains. A substantial portion of electrical power is defined as a portion that is greater than 80% of the total electrical power generated by the self-powered mobile electrical power hub.

Figure 1:
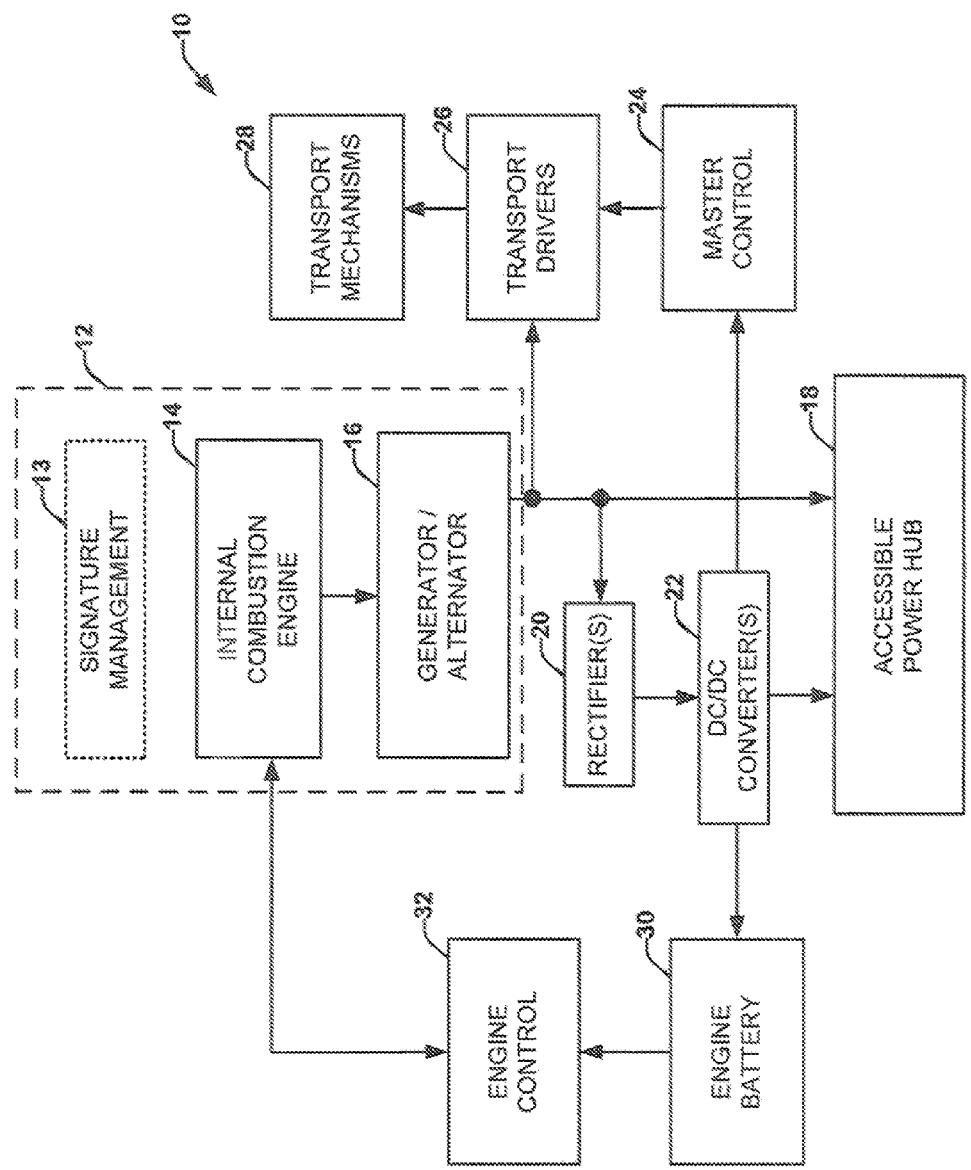
FIG. 1 illustrates a block diagram of a self-powered mobile electrical power hub in accordance with an aspect of the present invention.

FIG. 1 illustrates a block diagram of a self-powered mobile electrical power hub 10 in accordance with an aspect of the present invention. The self-powered mobile electrical power hub 10 can be an electrically-powered transport device, a robot, or other type of electrically-powered mobile vehicle that is self-powered. The self-powered mobile electrical power hub 10 can include an internal combustion engine driven generator 12 that includes an internal combustion engine 14 that drives a generator/alternator 16 to provide a source of alternating current (AC) or direct current (DC) electrical power. The internal combustion engine assembly 12 can optionally incorporate any desired signature-management equipment 13 (e.g., devices that limit the amount of sound produced at particular frequencies, limit the amount of heat signature produced by diffusing or dispersing heat, etc.). The internal combustion engine 14 can be a variety of different types of engine that release energy by combustion based fuel, such as diesel fuel, turbine fuel, ethanol, bio-mass, or jet fuel. The combustion engine 14 can be enclosed and water-cooled to maintain operation of the combustion engine 14 at a desired temperature, and provided with features to lessen the level of sound, heat, or other characteristics to desired levels. The source of AC electrical power provided by the generator 16 can be rectified by one or more rectifiers 20 and subsequently provided to one or more direct current (DC)/DC converters 22. The one or more DC/DC converters 22 can provide DC power at one or more DC voltage levels to power one or more components of the self-powered mobile electrical power hub 10. The one or more DC voltage levels and the source of AC electrical power are provided to an externally accessible power hub 18.

The accessible power hub 18 can include one or more battery charge compartments coupled to one or more DC voltage levels for charging batteries of varying voltages for powering one or more different mobile battery charge devices. The accessible power hub 18 can include one or more DC power receptacles for providing power to one more different DC powered devices, and one or more AC power receptacles for providing power to one or more AC powered devices. The self-powered mobile power hub 10 employs a substantial portion of the electrical power provided by the generator 16 during a transport mode in which the self-powered mobile power hub 10 is moving over a given terrain and provides a substantial portion of the electrical power provided by the generator 16 during an idle mode to the accessible power hub 18.

In the present example of FIG. 1, DC power is provided to an engine battery 30 that powers and engine controller 32 (e.g., engine control computer) configured to start the combustion engine 14 and monitor and control the operations of the combustion engine 14, such as engine temperature, coolant temperature and flows, and oil temperature and flows, revolutions per minute (RPM) and a variety of other parameters associated with operation of the combustion engine 14. DC power is also provided to a master controller 24 (e.g., master computer) that controls the operation of one or more electrically powered transport drivers 26. The one or more electrically powered transport drivers 26 are driven by AC power and control the movement of one or more mechanical transport mechanisms 28 that facilitate movement of the self-powered mobile power hub 10 across a given terrain. The one or more electrically powered transport drivers 26 can be for example electrically driven actuators and/or electrically driven motors. The one or more mechanical transport mechanisms 28 can be, for example, mechanical arms, mechanical legs and/or mechanical wheels, mechanical wings, or propellers.

The master controller 24 can maintain a plurality of transport profiles for performing different transport actions such as walking, climbing, rolling, digging, tunneling, propelling through air or across water. The master controller 24 can be configured to control the electrically powered transport drivers 26 and subsequently the mechanical transport mechanisms 28 based on a predetermined transport profile, or an invoked transport profile in response to activation of one or more sensors (not shown) responsive to detection or changes in a sensed condition such as an environmental change, object motion detection, or heat detection to name a few. The master controller 24 can also provide navigation and safety/anti-collision services, or these can be provided externally. The power hub need not be "driven" by a person.

Figure 2:
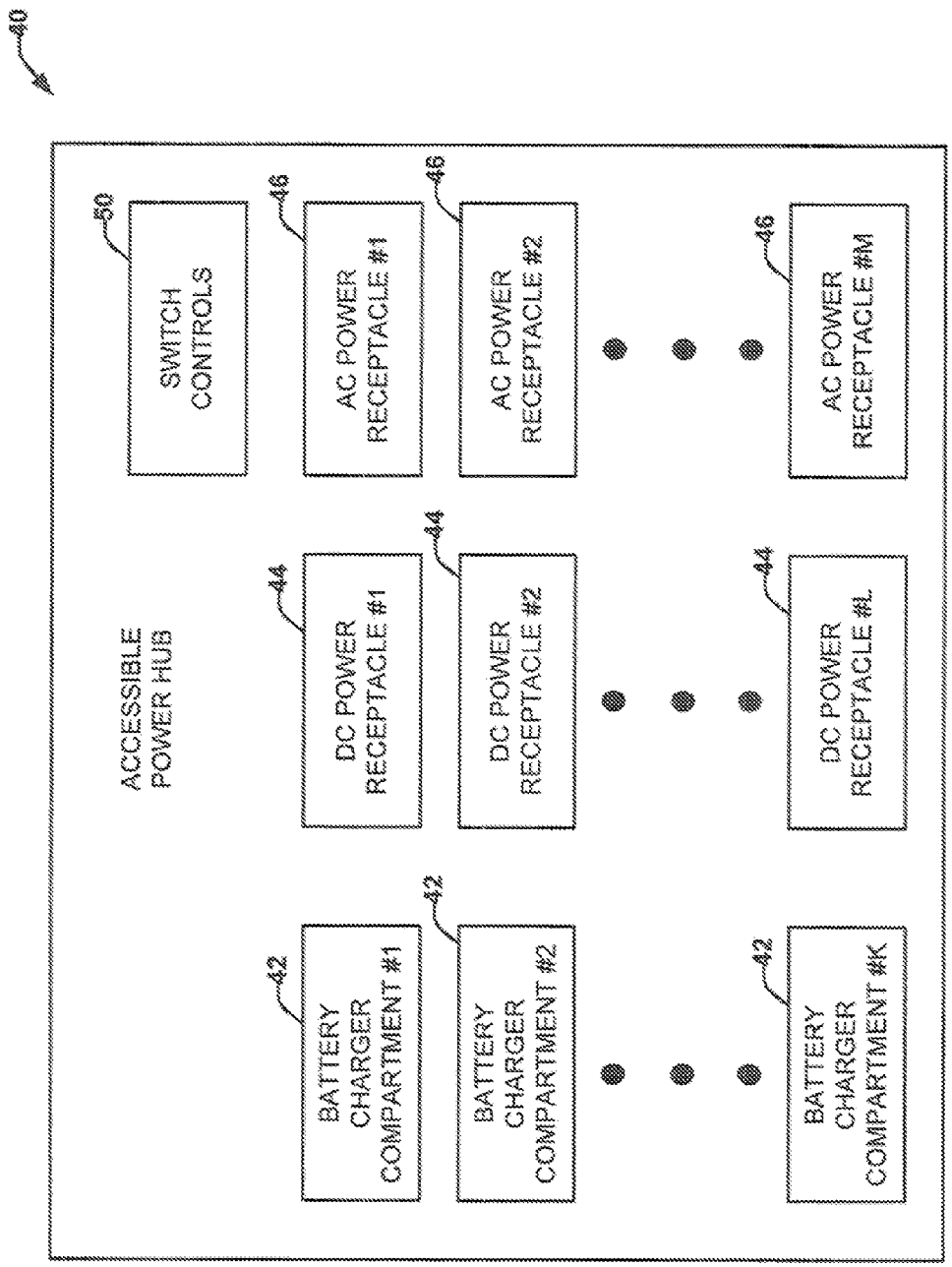
FIG. 2 illustrates an accessible power hub in accordance with an aspect of the present invention.

FIG. 2 illustrates an accessible power hub 40 in accordance with an aspect of the present invention. The accessible power hub 40 includes a plurality of battery charge compartments 42 labeled #1 through #K, where K is an integer greater than or equal to one. A given battery charge compartment 42 can be configured to receive a particular battery type of a given voltage and charge capacity, and provide a particular charge voltage and current to the battery. The plurality of battery charge compartments 42 can be configured to charge batteries of the same of different size, voltage, and/or charge capacity based on a particular application for which the self-powered mobile electrical power hub is to be employed. For example, for many military applications mobile devices are powered with 15 volt or 28 volt rechargeable batteries, while for many commercial application mobile devices may employ 1 ½ volt, 5 volt, 9 volt, or 12 volt rechargeable batteries.

The accessible power hub 40 further includes a plurality of DC power receptacles 44 labeled #1 through #L, where L is an integer greater than or equal to one. The plurality of DC power receptacles 44 can be employed to power DC powered devices having the same of different voltage and current requirements. For example, a DC power receptacle 44 can be employed to power a mobile device, while a respective battery for the mobile device is being charged. The accessible power hub further includes a plurality of AC power receptacles 46 labeled #1 through #M, where M is an integer greater than or equal to one. The plurality AC power receptacles 46 can be employed to power AC powered devices having the same or different voltage and current requirements. For example, the AC power receptacle devices 46 can be employed to power motors or solenoids associated with tools, instruments or appliances. A switch control bank 50 can be provided for enabling and disabling power at one or more of the DC power and AC power receptacles.

Figure 3:
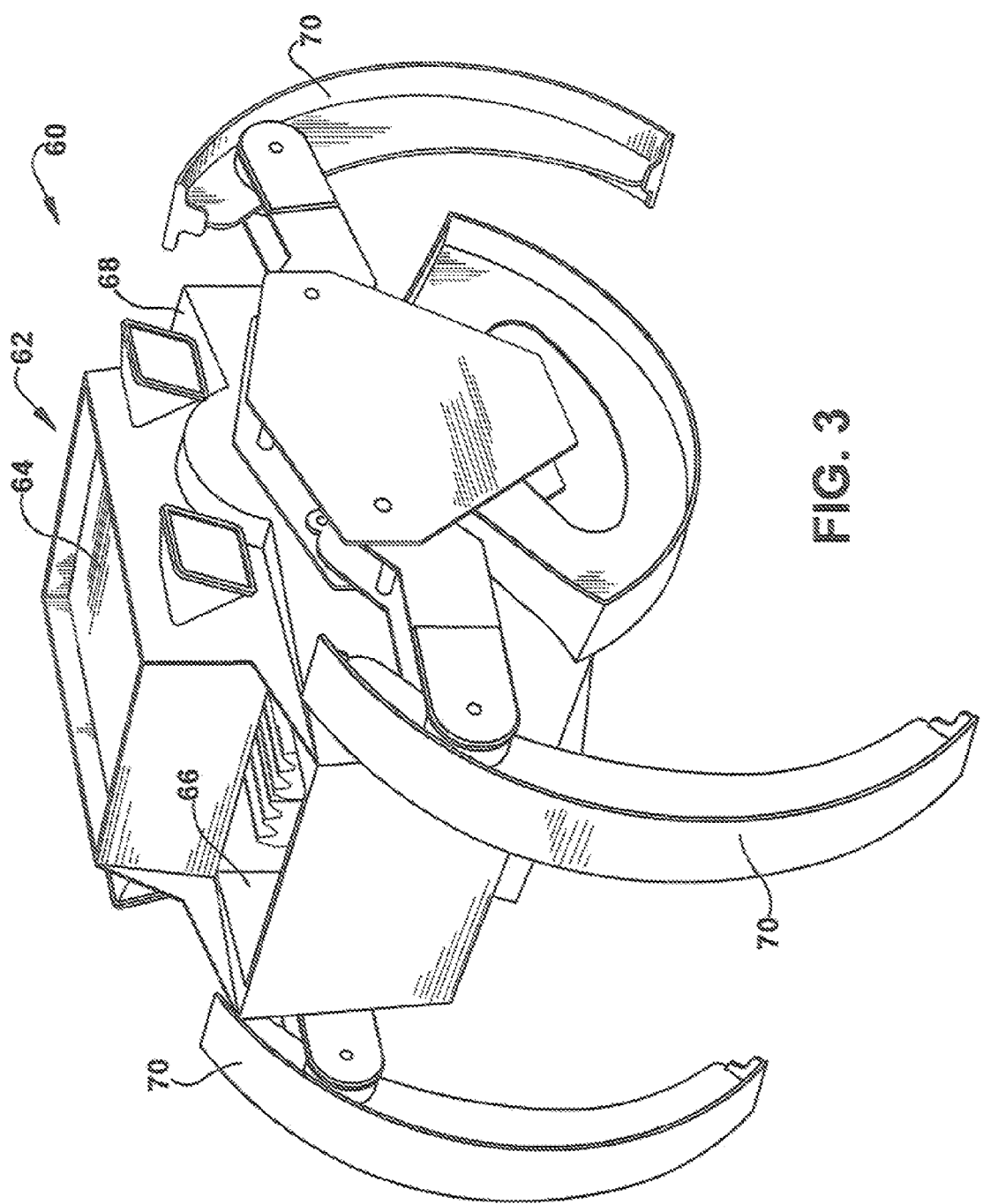
FIG. 3 illustrates an exemplary self-powered mobile electrical power hub having movable legs in accordance with an aspect of the present invention.
Figure 4:
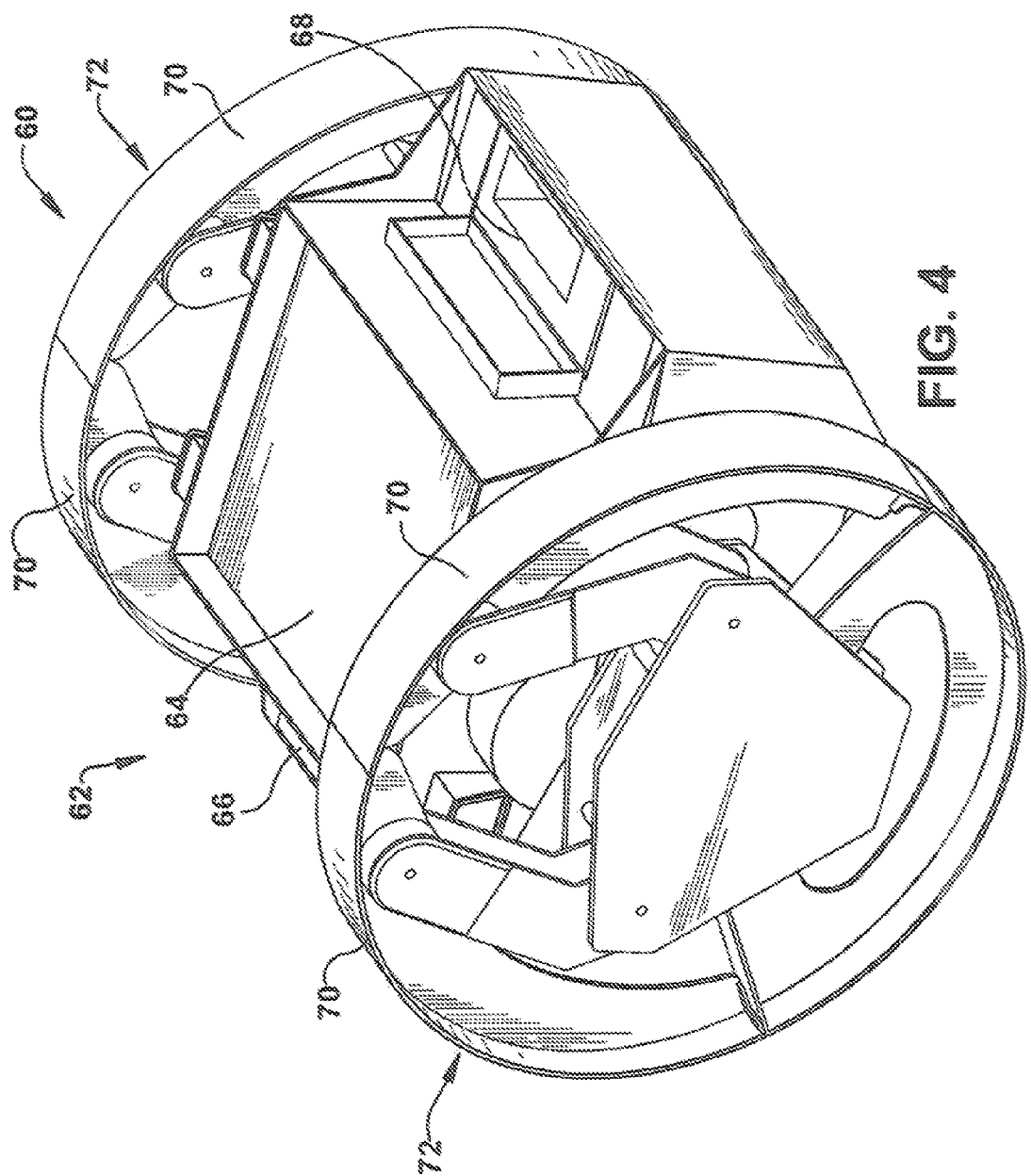
FIG. 4 illustrates the exemplary self-powered mobile electrical power hub of FIG. 3 with the movable legs contracted to form movable wheels in accordance with an aspect of the present invention.

FIGS. 3-4 illustrate an exemplary self-powered mobile electrical power hub 60 in accordance with an aspect of the present invention. The power hub 60 includes a main chassis 62 that includes a central control portion 64 that houses an internal combustion engine driven generator, rectifiers, DC/DC converters, electrically powered transport drivers, an engine battery, a master controller, any desired signature-management equipment (e.g., limit the amount of sound produced, limit the amount of heat produced, etc.), and an engine controller. The chassis 62 also includes a storage compartment 66 for storing equipment, water, or extra fuel and an accessible power hub 68. As illustrated in FIG. 3, the electrically power transport drivers can be, for example, linear actuators that drive a plurality of mechanical legs 70 that can move the self-powered mobile electrical power hub 60 across a terrain by walking or climbing. As illustrated in FIG. 4, the plurality of mechanical legs 70 can be extracted by, for example, by linear actuators to form wheels 72. The wheels 72 can move the self-powered mobile electrical power hub 60 across a terrain by rolling. The wheels 72 can be driven, for example, by electrically powered brushless motors. As previously discussed in FIG. 1, a substantial portion of the electrical power can be employed to move the self-powered mobile electrical power hub 60 in a transport mode, and a substantial portion of the electrical power can be available at the accessible power hub 68 in an idle mode.

Figure 5:
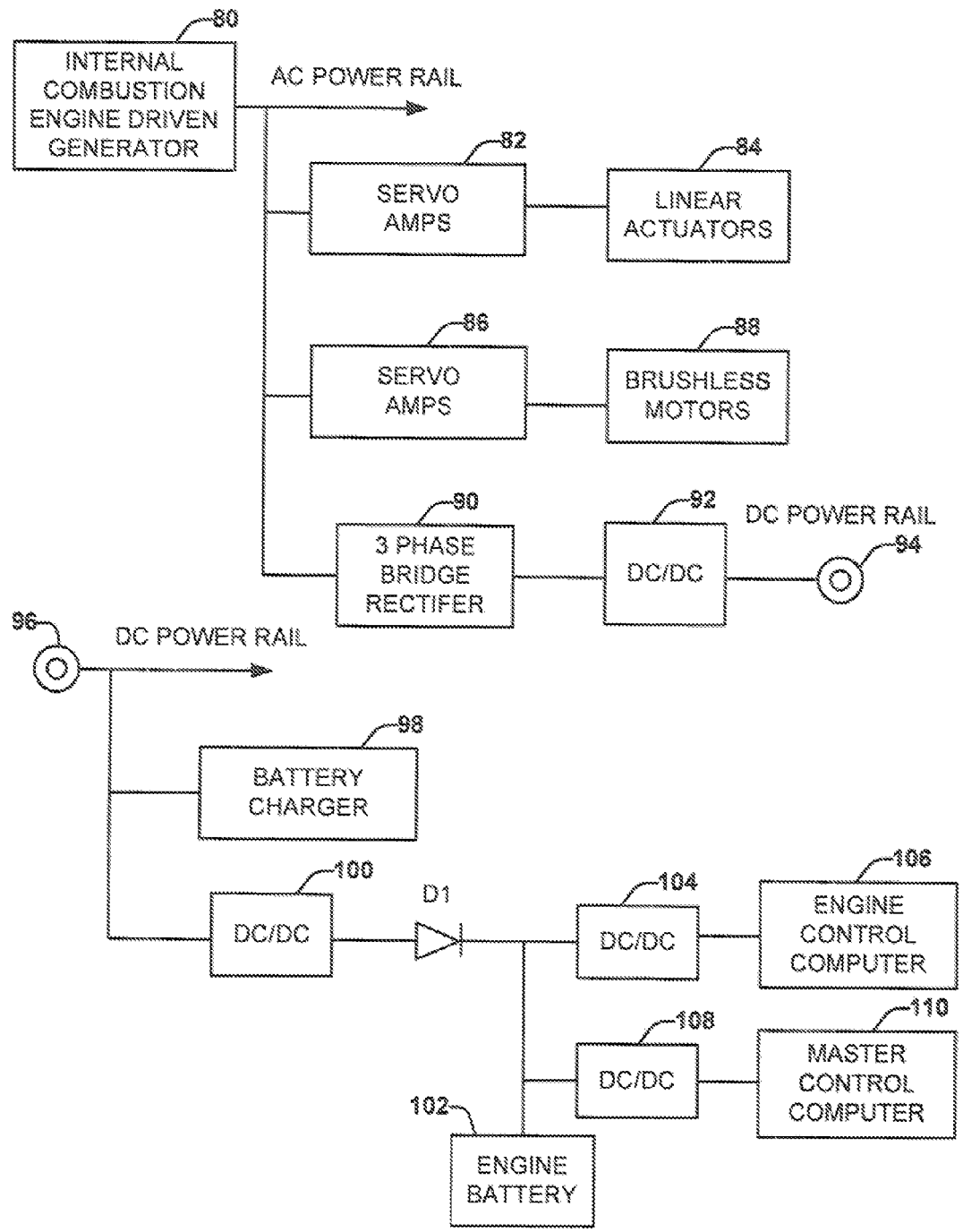
FIG. 5 illustrates a schematic diagram of the self-powered mobile electrical poser hub of FIGS. 3-4 in accordance with an aspect of the present invention.

FIG. 5 illustrates a schematic electrical diagram of the self-powered mobile electrical power hub of FIGS. 3-4. An internal combustion engine driven generator 80 provides AC power over an AC power rail. The AC power is provides to a first set of servo amplifiers 82 that drive linear actuators 84 that control movement of the legs 70 of the self-powered mobile electrical power hub 60 and extraction of the legs 70 into wheels 72. The AC power is provides to a second set of servo amplifiers 86 that drive brushless motors 88 that control movement of the wheels 72. The AC power is also provide to a 3-phase bridge rectifier D1 that rectifies the AC power signal to provide to a DC/DC converter 92 that converts the rectified signal into a DC power signal to provide a DC power rail at a first DC voltage (e.g., 28 volts) to a first coaxial connector 94. The first coaxial connector 94 is coupleable to a second coaxial connecter 96 to provide DC power to a battery charger 98 for charging a mobile battery. Although only one is shown, a plurality of battery chargers could be provided for charging batteries of the same or different size, voltage and/or current capacity. The DC power is also provided through a diode D1 to a second DC converter 104 that converts the first DC voltage to a second DC voltage to provide DC power to an engine battery 102. The second DC voltage is also provided to a third DC/DC converter 104 to provide a third DC voltage to an engine control computer 106 and a fourth DC/DC converter 108 to provide a fourth DC voltage 110 to a master control computer 110.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

What is claimed is:

1. A self-powered mobile electrical power hub comprising:
   an internal combustion engine driven generator for providing electrical power;
   at least one electrically powered transport driver configured to facilitate movement of the self-powered mobile electrical power hub; and
   an accessible power hub that provides external access to electrical power, wherein a substantial portion of the electrical power from the internal combustion engine driven generator is provided to power the at least one electrically powered transport driver in a transport mode and a substantial portion of the electrical power from the internal combustion driven generator is available at the accessible power hub in an idle mode, wherein the accessible power hub includes a plurality of separate battery charge compartments for charging batteries of different types that are employed for powering different mobile battery charged devices.

2. The hub of claim 1, wherein the the plurality of separate charge compartments are configured to charge batteries that have at least one of a different size, voltage and/or current capacity.

3. The hub of claim 1, wherein the accessible power hub includes at least one power receptacle for powering at least one external device.

4. The hub of claim 3, wherein the at least one power receptacle is at least one of a DC power receptacle and an AC power receptacle.

5. The hub of claim 3, further comprising at least one switch control for enabling and disabling access to power from the at least one power receptacle.

6. The hub of claim 1, further comprising at least one mechanical transport mechanism driven by the at least one transport driver to move the self-powered mobile electrical power hub.

7. The hub of claim 6, wherein the at least one mechanical transport mechanism is at least one of mechanical arms, mechanical legs, mechanical wheels, mechanical wings and mechanical propellers.

8. The hub of claim 6, wherein the at least one mechanical transport mechanism is a plurality of mechanical legs that can be extracted to form wheels and the at least one electrically powered transport driver comprises linear actuators that drive the plurality of mechanical legs to move the self powered mobile electrical hub across a terrain by walking or climbing and extract the mechanical legs to form mechanical wheels and electrically powered motors that drive the mechanical wheels to roll the self powered mobile electrical hub across a terrain.

9. The hub of claim 1, wherein the at least one electrically powered transport driver comprises at least one of an electrically driven motor and an electrically driven actuator.

10. The hub of claim 1, further comprising at least one rectifier and associated DC/DC converter for converting AC power from the internal combustion driven generator to DC power.

11. The hub of claim 10, wherein the DC power provides power to at least one component of the self-powered mobile electrical power hub.

12. The hub of claim 1, wherein each battery charge compartment of the plurality of battery charge compartments is configured to receive a particular battery type of a given voltage and charge capacity removed from a mobile battery charged device and provide a particular charge voltage and charge current to the removed particular battery type.

13. A self powered mobile electrical power hub comprising:
   an internal combustion engine driven generator for providing AC electrical power;
   at least one rectifier and associated DC/DC converter for converting AC power from the internal combustion engine driven generator to DC power;
   a plurality of mechanical transport mechanisms that move the self powered mobile electrical power hub;
   a plurality of electrically driven transport drivers that each drive a respective transport mechanism of the plurality of mechanical transport mechanisms; and
   an accessible power hub that provides external access to electrical power, wherein the accessible power hub includes a plurality of separate battery charge compartments configured to employ DC power for charging batteries of different types that are employed for powering different mobile battery charged devices.

14. The hub of claim 13, wherein the plurality of battery charge compartments are configured to charge batteries of a same or a different size, voltage and/or current capacity.

15. The hub of claim 13, wherein the plurality of mechanical transport mechanism are at least two of, mechanical legs, mechanical wheels, mechanical wings and mechanical propellers.

16. The hub of claim 13, further comprising a master controller configured to control the plurality of transport drivers to invoke movement of the self powered mobile electrical power hub by the plurality of mechanical transport mechanisms.

17. The hub of claim 16, wherein the master controller maintains a plurality of transport profiles for performing different transport actions, the master controller being configured to control the plurality of transport drivers and the plurality of mechanical transport mechanisms based on an invoked transport profile in response to activation of one or more sensors responsive to detection or changes in a sensed condition.

18. The hub of claim 16, further comprising an engine controller configured to monitor and control the operation of the internal combustion engine driven generator and a signature manager configured to limit at least one of sound and heat of the generator.

19. The hub of claim 13, further comprising a master controller configured to control the plurality of transport drivers to invoke movement of the self powered mobile electrical power hub by the plurality of mechanical transport mechanisms, wherein the master controller maintains a plurality of transport profiles for performing different transport actions, the master controller being configured to control the plurality of transport drivers and the plurality of mechanical transport mechanisms based on an invoked transport profile in response to activation of one or more sensors responsive to detection or changes in a sensed condition; and an engine controller configured to monitor and control the operation of the internal combustion engine driven generator and a signature manager configured to limit at least one of sound and heat of the generator.

20. The hub of claim 13, wherein the plurality of mechanical transport mechanisms are a plurality of mechanical legs that can be extracted to form wheels and the plurality of electrically powered transport drivers comprise linear actuators that drive the plurality of mechanical leg to move the self powered mobile electrical hub across a terrain by walking or climbing and extract the mechanical legs to form mechanical wheels and electrically powered motors that drive the mechanical wheels to roll the self powered mobile electrical hub across a terrain.

21. The hub of claim 13, wherein each battery charge compartment of the plurality of battery charge compartments is configured to receive a particular battery type of a given voltage and charge capacity removed from a mobile battery charged device and provide a particular charge voltage and charge current to the removed particular battery type.

22. A self-powered mobile electrical power hub comprising:
 means for providing electrical power;
 means for moving the self-powered mobile electrical power hub;
 means for providing external access to electrical power, wherein a substantial portion of the electrical power from means for providing electrical power is provided to the means for moving the self-powered mobile electrical power hub in a transport mode and a substantial portion of the electrical power from the means for providing electrical power is available at the means for providing external access to electrical power in an idle mode, wherein the means for providing external access to electrical power comprises means for charging batteries that are employed for powering one or more different mobile battery charged devices;
 means for controlling the means for moving to invoke movement of the self powered mobile electrical hub, wherein the means for controlling maintains a plurality of transport profiles for performing different transport actions, the means for controlling being configured to control the means for moving based on an invoked transport profile in response to one or more means for sensing detecting a sensed condition or detecting changes in a sensed condition: and
 means for controlling the means for providing electrical power that limits at least one of sound and heat of the means for providing electrical power.

* * * * *